No. 785,630. PATENTED MAR. 21, 1905.
W. McCLAVE.
CONVEYING MECHANISM FOR FURNACES.
APPLICATION FILED JUNE 22, 1904.
6 SHEETS—SHEET 1.
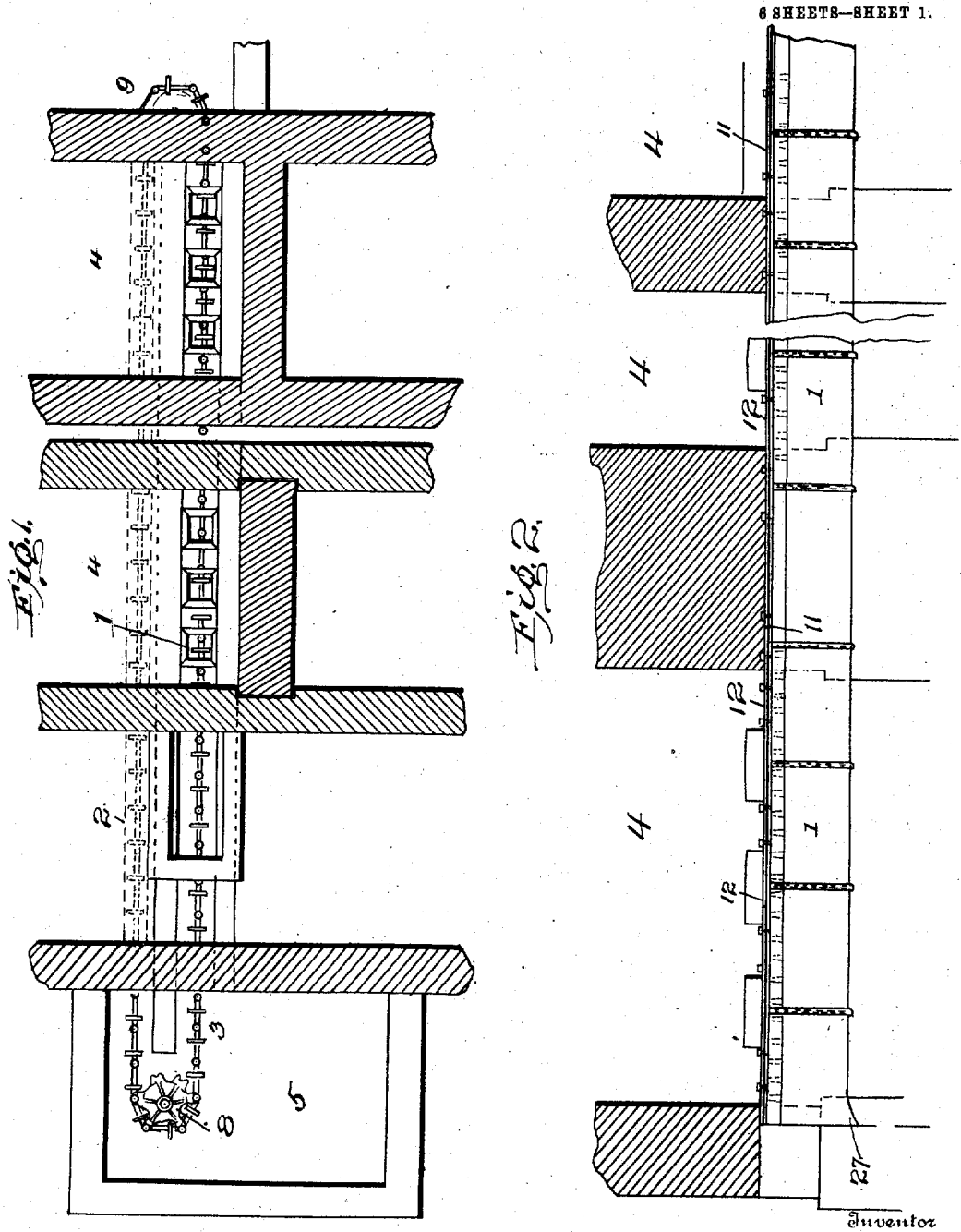
Witnesses
Inventor
William McClave
By Mason, Fenwick & Lawrence
Attorneys No. 785,630. PATENTED MAR. 21, 1905.
W. McCLAVE.
CONVEYING MECHANISM FOR FURNACES.
APPLICATION FILED JUNE 22, 1904.
6 SHEETS—SHEET 2.
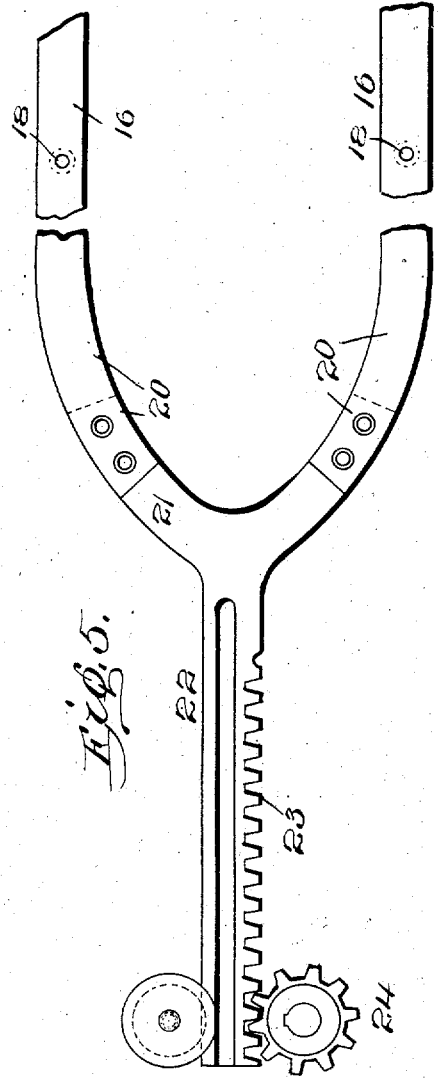
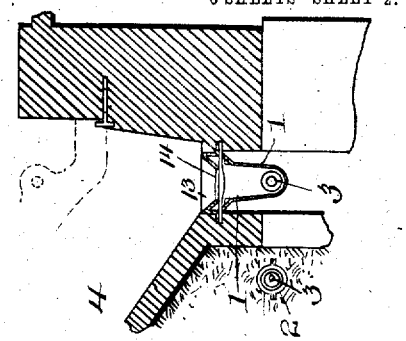
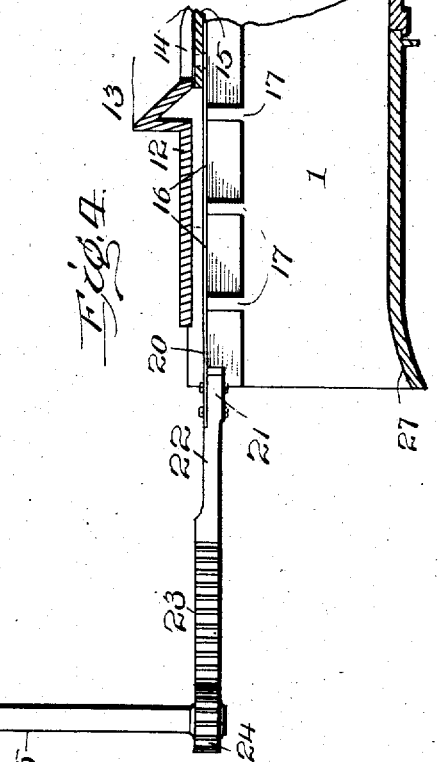

No. 785,630. PATENTED MAR. 21, 1905.
W. McCLAVE.
CONVEYING MECHANISM FOR FURNACES.
APPLICATION FILED JUNE 22, 1904.
6 SHEETS—SHEET 3.
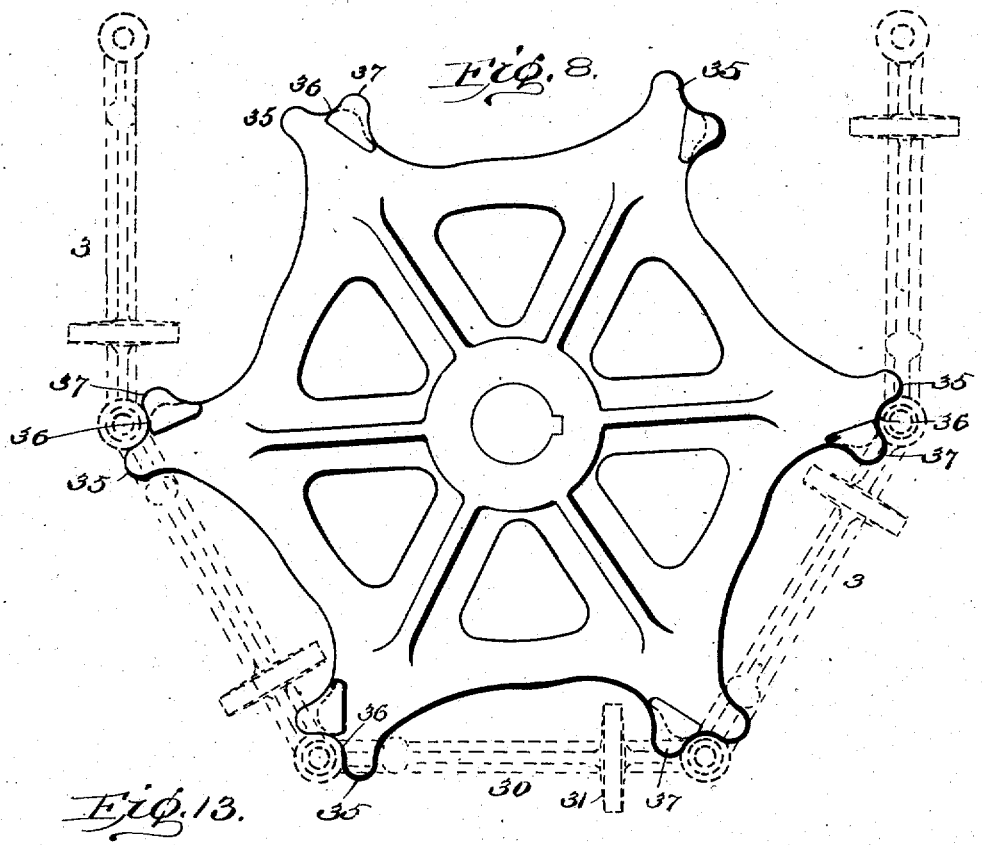
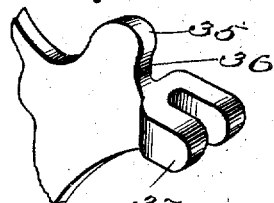
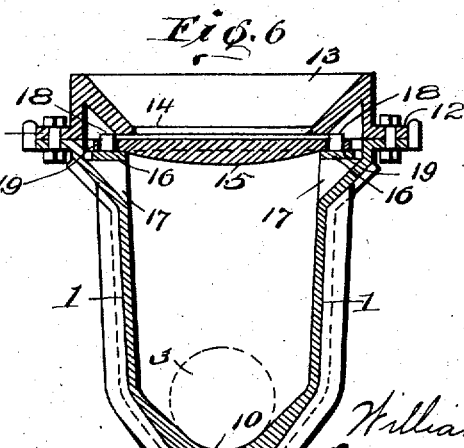

No. 785,630. PATENTED MAR. 21, 1905.
W. McCLAVE.
CONVEYING MECHANISM FOR FURNACES.
APPLICATION FILED JUNE 22, 1904.
6 SHEETS—SHEET 4.
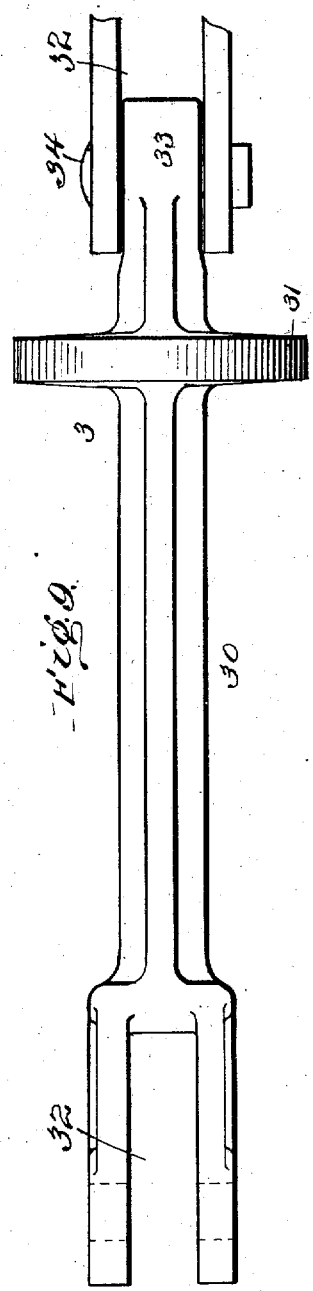
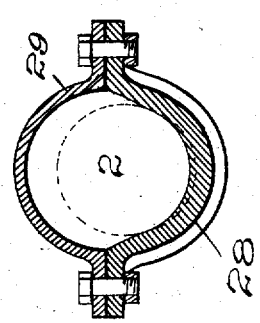
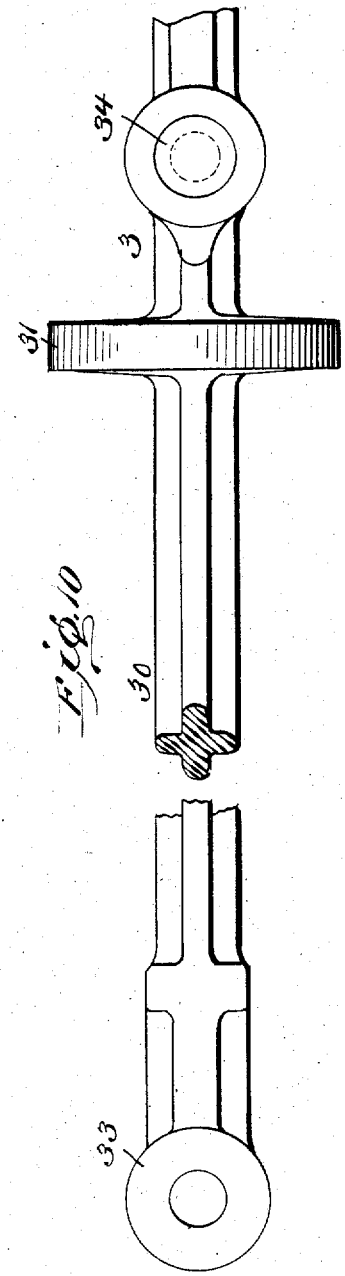
Witnesses
J. M. Fowler Jr
Cassell Severance
Inventor
William McClave
By Mason, Fenwick & Lawrence
Attorneys No. 785,630. PATENTED MAR. 21, 1905.
W. McCLAVE.
CONVEYING MECHANISM FOR FURNACES.
APPLICATION FILED JUNE 22, 1904.
6 SHEETS—SHEET 5.
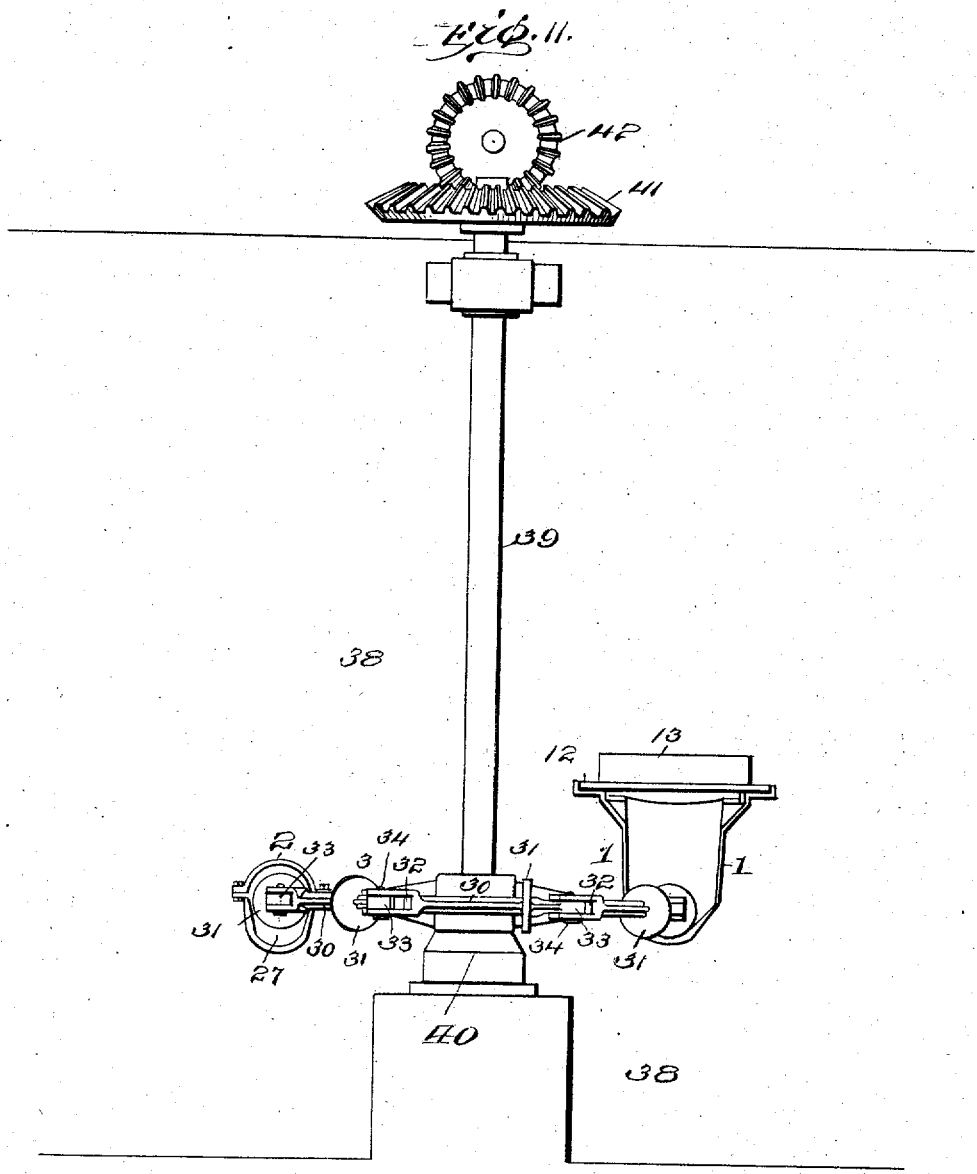

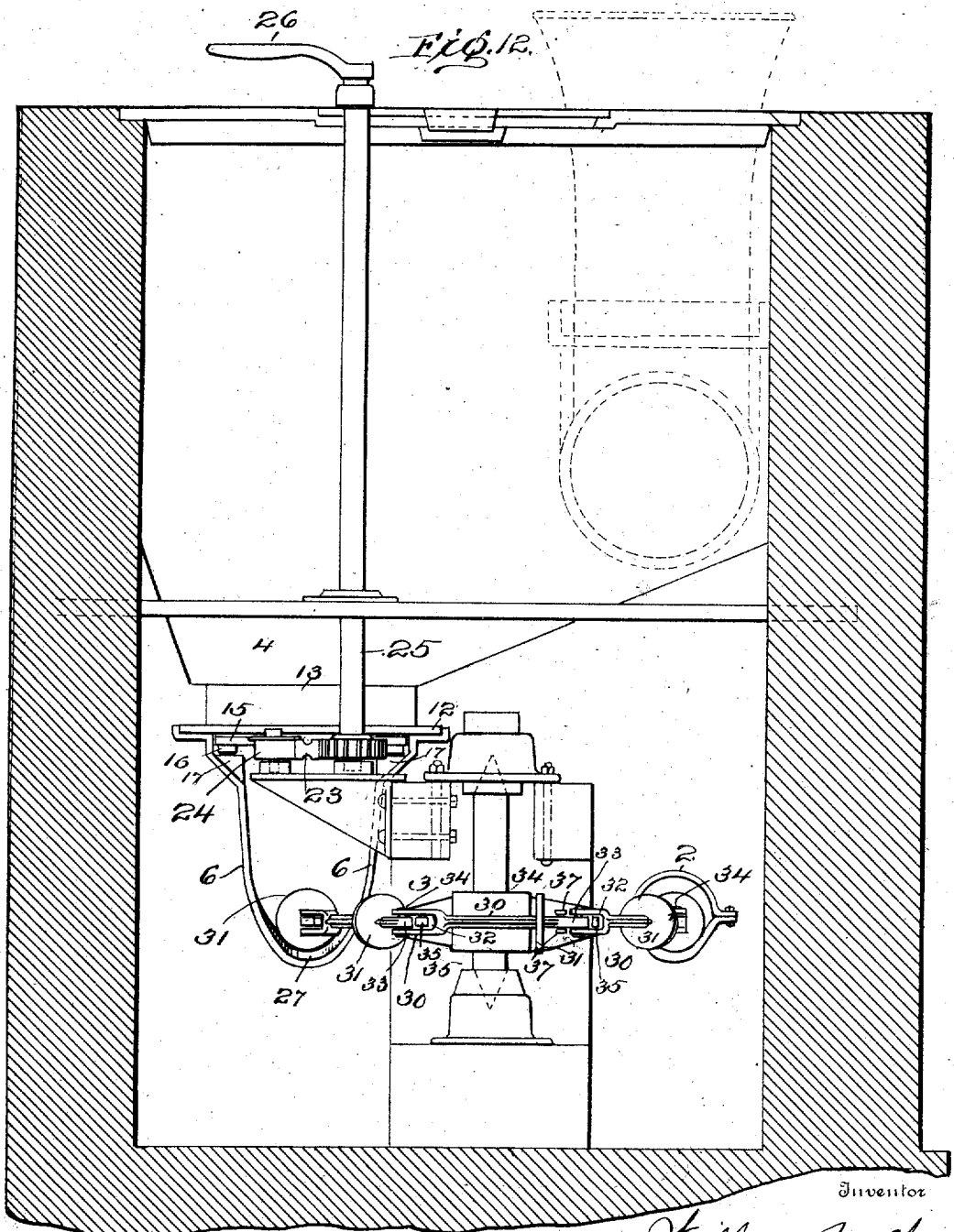

No. 785,630.

Patented March 21, 1905.

UNITED STATES PATENT OFFICE.

WILLIAM McCLAVE, OF SCRANTON, PENNSYLVANIA, ASSIGNOR TO McCLAVE-BROOKS COMPANY, A CORPORATION OF PENNSYLVANIA.

CONVEYING MECHANISM FOR FURNACES.

SPECIFICATION forming part of Letters Patent No. 785,630, dated March 21, 1905.

Application filed June 22, 1904. Serial No. 213,714.

*To all whom it may concern:*

Be it known that I, WILLIAM McCLAVE, a citizen of the United States, residing at Scranton, in the county of Lackawanna and State of Pennsylvania, have invented certain new and useful Improvements in Conveying Mechanism for Furnaces; and I do hereby declare the following to be a full, clear, and exact description of the invention, such as will enable others skilled in the art to which it appertains to make and use the same.

This invention relates to improvements in conveying apparatus, and particularly such as is adapted for use in the removal of ashes from the ash-pits of one or more furnaces.

The invention consists in certain novel constructions, combination, and arrangement of parts, as will be hereinafter more fully described and claimed.

In the drawings, Figure 1 is a diagramatical plan view illustrating the arrangement of a conveying apparatus as in position for receiving materials discharged from a series of furnace ash-pits. Fig. 2 is a vertical sectional view through a portion of the ash-pits of a battery of furnaces, the relation of the conveyer-duct with respect to the same being shown. Fig. 3 is a detail vertical sectional view through a portion of a furnace ash-pit, taken longitudinally with respect to the furnace and transversely of the duct. Fig. 4 is a detail sectional view of one end of the duct, showing the means for operating the slides which control the inlet-apertures of the duct. Fig. 5 is a detail plan view showing the rack and a portion of the slide-carrying bars of the duct. Fig. 6 is an enlarged vertical transverse sectional view through the receiving portion of the duct, a slide for controlling an inlet-opening being shown therein. Fig. 7 is a similar sectional view taken through the return portion of the ash-duct. Fig. 8 is an enlarged plan view of a portion of the conveyer-chain, one of the sprocket-wheels for carrying the same being shown in engagement therewith. Fig. 9 is an enlarged view in elevation of some of the links of said chain. Fig. 10 is an enlarged plan view of one of the bars forming the link of the chain. Fig. 11 is an end elevation of the ash-conveying system, taken from the pit in which the ashes are deposited; and Fig. 12 is an end elevation of the ash-conveyer system, taken from the tail-pit. Fig. 13 is a detail of a portion of the sprocket-wheel.

The conveying mechanism forming the subject-matter of the present invention, while capable of use for the collection and removal of various kinds of materials and applicable to various places where conveyers are needed, is especially well adapted for use in the collection and removal of ashes from the ash-pits of one or more furnaces. The duct is so formed that the ashes cannot be well clogged therein, and if foreign materials, such as bricks or other articles, accidentally fall into the duct there will be sufficient room above the traveling conveyer therein to prevent any clogging or interruption of the operation of said conveyer. The conveyer-chain is also formed so that the flights will engage a large area of the ashes to be removed, while at the same time the said flight will protect and to some extent cover the joints of the chain.

In the drawings, 1 indicates a collecting and conveying trough or duct, and 2 indicates a return-duct for the endless conveyer. 3 indicates a conveyer-chain formed so as to travel in the said duct and propel materials deposited therein.

As above intimated, the conveying apparatus sought to be protected in the present application is applicable to various positions in which it is necessary to collect and remove materials which accumulate or are deposited in given places. As, however, the mechanism is especially well adapted for the removal of ashes from the ash-pits of furnaces, I have illustrated my preferred form of mechanism in connection with the ash-pits of a battery of furnaces.

As shown in Figs. 1 and 2, the duct may be extended beneath one or more ash-pits, as 4, which are of any desired contour and which, of course, are usually located beneath the grates of furnaces. As indicated in Fig. 1, the conveyer is so arranged that the endless chain will propel or carry the ashes from the pits 4 through the larger duct 1 of the system to a collecting-pit 5, located at one end of the said battery of furnaces. The return stretch of the chain passes through the smaller duct 2, which, as shown in Fig. 3, may be arranged in the ground or brickwork beneath the ash-pit 4. The conveying-chain employed is of an improved type, as will be hereinafter more fully described, and passes around a propelling and a guiding sprocket-wheel, as 8 and 9, respectively arranged at the ends of the stretches of the chain.

The collecting portion of the conveying mechanism is made in the form of a duct U-shaped in cross-section. The bottom of the trough or duct 1 is made curved upon its inner surface, as shown at 10 in Fig. 6, so as to fit the flights of the conveyer-chain 3. Above the conveyer-chain the trough is made considerably wider than the conveyer-chain, and the top of the trough is covered by suitable cover-plates, as 11 and 12. The cover-plates 12 are formed with hopper-shaped tops, as 13, having central inlet-apertures 14. These hopper-plates are arranged at suitable intervals in the bottom of the ash-pits 4. The apertures 14 of the hoppers 13 are capable of being closed by means of slides or plates 15, which are movably mounted beneath them. The slides 15 are carried by longitudinally-arranged straps or bars 16, movably mounted at the sides of the conveyer-troughs, as clearly illustrated in Fig. 6. The slide-carrying straps or bars 16 are supported in position by means of lugs 17, which project inwardly from the upper outwardly-flared edges of the conveyer-trough 1. This construction is of such a character that ashes will not accumulate about the bars and prevent their movement.

While the plates 15 can be secured to the actuating-straps 16 in any desired manner, I prefer to so connect them that they may be easily removed when the hopper-plates 12 are taken from their positions upon the duct. The means illustrated for securing the slides 15 to the straps or bars 16 comprises a series of upwardly-projecting pins or studs 18, which engage the correspondingly-arranged apertures 19, formed in the outer edges of each slide. In assembling the parts the bars or straps 16 are mounted above the triangular lugs 17, with the studs 18 projecting upwardly. The slides 15 are then placed upon the same, the said studs engaging the apertures 19, and by placing the hopper-plates 12 above the said slides and securing them to the upper edges of the trough, as shown in the drawings, the slides are prevented from becoming disengaged with the studs of the straps or bars 16.

The slides are made of sufficient width to completely close the apertures 14 in the hopper-plates, and it will be evident that by moving the bars 16 longitudinally the slides may be pushed back from beneath the openings to permit ashes to fall into the conduit, or upon moving the strap in the opposite direction the slides may be made to entirely close the apertures in the hopper-plates and prevent the discharge of the materials into the said conduit. A simple and effective manner of operating the elongated bars 16 is shown in the drawings, the said bars being curved forwardly at one end, as illustrated at 20. The curved ends of the said bars are secured to the bifurcated end 21 of a rack-bar 22. The rack 23, carried by the said rack-bar, engages an actuating-pinion 24, which is rotated by means of a vertical shaft 25, extending upwardly therefrom. The shaft 25 is made sufficiently long to reach a point above the floor-line adjacent to the furnaces, and a handle 26 is secured to the upper end of the said rod or shaft 25 for turning it. In this manner the pinion may be caused at any time to shift the position of the slides beneath the hopper-openings 14. It is of importance that an ash-duct like that described be provided with means for controlling the entrance of the ashes into the same from the various ash-pits reached by the conveying system. This is particularly the case when a forced draft or blast is employed in connection with the furnace, as the ash-pit should be properly sealed to prevent the escape of said blast except through the fuel carried by the grates. It is not necessary to operate the ash-removing conveyer continuously, and in the intervals when it is not being employed for removing the ashes the slides are closed and the ashes are permitted to accumulate in the hoppers 13, protecting them, together with the slides, from the heat of the furnaces.

The ducts are preferably formed of a series of sections applied end to end, and their meeting ends may be rabbeted one into the other, as illustrated in Fig. 2. The end sections of the ducts are preferably flared, as at 27, so that the flights of the chain will be guided into the same from the pits at each end of the system.

The return-duct 2 need not be as large in cross-section as the receiving-duct 1, but is preferably made a little larger than the conveying-chain which passes through it, a preferred cross-sectional shape for the return-duct being illustrated in Fig. 7. The said duct will be seen to be formed of a lower section the bottom portion 28 of which fits more or less closely the edge contour of the flights on the conveyer-chain. The said return-duct is also formed with a top section 29 and made sufficiently large to not touch the flights of the chain. The upper and lower sections 28 and 29 are formed with laterally-projecting flanges which are bolted together, as shown in said Fig. 7. As shown in Fig. 3, the collecting portion of the duct 1 is arranged beneath the lowest portion of the ash-pit, the walls thereof converging toward that point. The return-duct 2, as will be seen by reference to Fig. 3, may be arranged in the masonry or earth beneath the ash-pit and to one side of the duct 1.

The endless conveying means traveling in the conveying-duct forms an important feature of the invention, for it is constructed to coöperate with the said duct for accomplishing the removal of the ashes in an effective manner. The said conveyer 3 is formed of a series of links 30, which are hinged together, being connected one with the other at their ends, as shown in enlarged form in Figs. 9 and 10. Each bar of the conveying-chain is provided with means for pushing or propelling the materials which the chain is designed to move. The pusher or flight 31 shown in the drawings is preferably an integral one and is formed near one end of each chain-link. The flights of the links are made of a suitable contour to fit the conduits, and of course if the conduits are rectangular or otherwise shaped in cross-section the flights would have a corresponding shape. As above stated, the conduits are preferably made to receive and fit about the flights. The conveyer-chain is of the type known as the "monobar" chain, in which the links are made each of a single bar joined or connected together at their ends. While the bar forming each link may be made cylindrical, I preferably form the said bars with a corrugated contour, the ribbed or fluted portions thereof extending longitudinally of the bars and producing a cross-sectional shape, like that illustrated in Fig. 10. The bars thus formed possess great strength without the necessity of giving them a large cross-sectional area. One end of each link is bifurcated, as 32, and thus adapted to receive the adjacent end of the next link. The opposite end of each link is flattened, as at 33, so as to fit into the said bifurcation of the adjacent link, and pivot-pins 34 are passed through the apertured ends of the said links, making an articulating joint. The pins may be in the form of bolts or rivets, or cotter-pins may be used, if desired. The bifurcation at the ends of the links is made of sufficient length to accommodate the teeth 35 of the sprocket-wheels 8 and 9. The said teeth are curved upon one side, as at 36, so as to fit upon the flattened ends 33 of the links of the chain, and the actuating sprocket-wheel is thus able to propel the chain forwardly. The sprocket-wheels are also preferably provided with bifurcated teeth 37, which engage the bifurcated ends of the links upon each side of the adjacent flattened-link ends. The flights 31 of the chain-links, while capable of arrangement at any point along the length of the said links, are preferably fixed, as illustrated, near the ends of the said links. By this structure the flights are prevented from tipping in the ducts, for the ends of the links, which are distant from the flights, are so near to the flights of the adjacent links that the monobars 30 cannot tip or get out of alinement. By having the flights so close to the joints of the chain the said joints are protected to a considerable degree from clogging in the material moved in the ducts and the joints are thus less likely to get out of order or so clogged as to not operate freely.

In forcing the chain through the ducts one of the sprocket-wheels, as 8, is driven for actuating the chain, the teeth 35 bearing against the flat ends 33 of the monobars for this purpose. The chain at its other end passes around a wheel 9, similar to the wheels 8, and the bifurcated ends of the monobars bearing against the sprocket-teeth 37 of said wheel turn the same in unison with the other wheel, so as to properly support the joints of the chain in the same manner as they are supported by the driving or actuating sprocket-wheel 8. The chain in passing through the receiving-duct 1 moves or pushes all of the ashes which drop in front of the flights 31 and the ashes are dropped into a suitable pit at the end of said duct 1, from which pit the ashes may be hoisted or otherwise removed to any desired point or may be loaded into cars or vehicles or other means for removing them. The chain in its return movement passes through the smaller duct 2.

As shown in Fig. 11, the conveyer-chain passes about a driving-sprocket which is mounted in the tail-pit 38 of the system, the said sprocket being driven by a shaft 39, vertically mounted in said pit and supported upon a suitable bearing 40, mounted in said pit. The upper end of the shaft 39 is provided with an actuating-gear 41, which meshes with a driving-pinion 42. Motion is imparted to the pinion 42 by any suitable or desired mechanism, and the actuation of the shaft 39 through the agency of the gears 41 and 42 operates to properly feed the conveyer-chain through the ducts of the system.

In practice the chain described is found very effective for the purpose desired and does not get out of order easily, but is found to be capable of operation for a great while without much attention. The construction of the chain is an important feature of an ash-removing mechanism, for ashes always have a detrimental action upon mechanism of various kinds and are likely to clog joints and cause them to wear excessively. In places where the ash-pits are subject to cold temperatures, as in cold climates, the ashes often become frozen and tend to hinder if not break endless conveyers which have been commonly used. I find in practice that my improved monobar endless chain with the flights near one end of each link is capable of operation under very adverse circumstances. The arrangement of the flights also greatly protects the joints of the chain and prevents them from becoming clogged or frozen.

From the above description it will be evident that my improved ash-removing mechanism is especially well adapted for use in connection with furnaces of all kinds and that the materials accumulating in the ash-pit of a battery of furnaces can be removed and quickly collected in any suitable place. When the endless conveyer is not in operation for removing the ashes, the slides are so moved as to close the openings in the conduit-hoppers and a sufficient ash is left to accumulate upon the said slides not only to seal the ash-pit, but to protect the metal forming the parts of the conduit and slides from excessive heat from the furnaces.

Having now described the nature of my said invention, what I claim as new, and desire to secure by Letters Patent, is—

1. A conveying mechanism comprising a duct, approximately U-shaped in cross-section having a bottom formed with a central curved portion, and inclined side portions extending therefrom and side walls extending upwardly from the inclined portions of the bottom, the side walls affording ample capacity for material above the conveyer, a conveyer moving in the duct, the said conveyer engaging only the curved portion of the floor, and means for operating the conveyer.

2. A conveying mechanism comprising a partially-covered duct, the duct having a bottom formed with a centrally-curved portion and inclined side portions extending therefrom, side walls extending upwardly in approximately vertical positions from the inclined portions of the floor, a conveyer moving upon the floor and engaging only the curved portion thereof, the extension of the side walls above the conveyer affording ample room for accommodating foreign materials which may fall into the duct without the danger of clogging the same, and means for operating the conveyer.

3. A conveying mechanism comprising a duct having a number of inlet-apertures in the top wall thereof, slides for controlling the passage of material through said apertures and hopper cover-plates mounted upon the duct above the apertures, for holding the said slides in position and directing material through the said apertures.

4. A conveying mechanism comprising a duct having inwardly-projecting lugs upon its walls, slides for controlling the inlet of materials to the duct, the said lugs supporting the slides in their movement and yet permitting materials which work around the edges of the slide to fall into the said duct, and a conveyer moving in the said duct.

5. A conveying mechanism comprising ducts formed with inclined upper edges upwardly-projecting lugs formed thereon, reciprocating bars traveling upon the said lugs and slides carried by the said bars and controlling the inlet of material to the duct.

6. A conveying mechanism comprising a conveying trough or duct U-shaped in cross-section, a series of inlet-apertures formed in the upper surface thereof, longitudinally-moving bars mounted in the duct, upwardly-projecting lugs upon the sides of the chute for supporting the bars, cut-off slides carried by the bars and a rack connected with the bars for reciprocating them.

7. A conveying mechanism comprising a duct formed with inclined upper edges, inwardly and upwardly extending lugs projecting from the surface of said inclined edges, reciprocating slides mounted on the said lugs and controlling the inlet of materials to the duct, and means for moving the material deposited within the duct.

8. An ash-removing conveying mechanism comprising a receiving-duct extending beneath the ash-pits of furnaces, a return-duct arranged parallel thereto, a traveling conveyer extending through the ducts comprising a series of links connected together to form a chain and integral flights, carried by the bars forming each of said links, for propelling the material collected in the receiving-duct.

9. An ash-removing conveying mechanism comprising a duct extending beneath the ash-pits of furnaces, a traveling conveyer mounted therein and made up of a series of links having pivotal connections, and integral link-supporting flights formed upon the said links of the chain just in front of each pivotal connection for propelling the material through the duct, the flights projecting radially in all directions from the links and covering the pivotal connections.

10. An ash-conveying apparatus comprising a duct and an endless chain moving therein, slides for controlling the admission of material to the duct, bars carrying the said slides and provided with upwardly-projecting lugs or studs the slides having apertures therein for fitting upon the said studs, and hopper-plates arranged above the slides and preventing the same from becoming disengaged from the said studs.

11. An ash-conveying mechanism for furnaces comprising a duct and an endless conveyer-chain traveling therein, the chain being made up of a number of monobars, hinged connections interposed between the monobars and supporting flights formed on the monobars and radiating in all directions therefrom, the flights being approximately at the ends of the links and immediately in front of the hinged connections for displacing a large portion of the material in the duct and covering and protecting the said pivotal connections.

12. An ash-removing mechanism for furnaces comprising an endless conveyer-chain and ducts for receiving the same, the said ducts having inlet-ports at suitable points, reciprocating slide-changing bars operating adjacent to said ports, cut-off slides carried by the said bars, a rack for moving the bars, a pinion engaging the same and means extending above the floor-line for operating the said pinion.

13. An endless conveyer comprising a chain made up of a succession of corrugated monobars having articulating connections and a flight arranged approximately at one end of each monobar, the said flights surrounding the monobars and formed upon the corrugated portions thereof.

14. An endless conveyer comprising a chain made up of a succession of single bars pivotally connected at their ends and integral flights formed upon each bar and extending beyond the bar entirely around the same.

15. An endless conveyer for ducts comprising a chain formed of a series of single bars bifurcated at one end and flattened at the other, flights carried by each bar, a sprocket-wheel engaging the conveyer at each end, the said sprocket-wheels having a single tooth for projecting into the bifurcated portion of a link and engaging the flattened end of the adjacent link and a bifurcated tooth for engaging the bifurcated ends of the links.

16. An endless conveyer comprising a chain formed of successively-connected monobars, and integral flights formed upon the bars near the ends thereof and adjacent to the connections between each bar and its adjacent bar.

17. In a conveying mechanism, the combination with a duct, of a conveyer moving therein formed of a succession of single bars pivotally connected, flights formed upon said bars adjacent to their pivoted connections so as to properly support the bars in the duct, the location of the flights making it possible to support each bar without the liability of tipping by means of a single flight.

In testimony whereof I affix my signature in presence of two witnesses.

WILLIAM McCLAVE.

Witnesses:
   Max F. Henkelman,
   Charles P. O'Malley.